(12) United States Patent
Barrett et al.

(10) Patent No.: US 7,000,219 B2
(45) Date of Patent: Feb. 14, 2006

(54) SOFTWARE DEVELOPMENT PROCESS

(75) Inventors: Stephen Barrett, Portlaolse (IE); Colum Higgins, Dublin (IE); Colum Twomey, Dublin (IE); Malcolm Evans, County Dublin (IE)

(73) Assignee: Wilde Technologies Limited, Dublin (IE)

( * ) Notice: Subject to any disclaimer, the term of this patent is extended or adjusted under 35 U.S.C. 154(b) by 653 days.

(21) Appl. No.: 09/985,501

(22) Filed: Nov. 5, 2001

(65) Prior Publication Data
US 2002/0104068 A1 Aug. 1, 2002

(30) Foreign Application Priority Data
Nov. 3, 2000 (EP) .................................. 00650178

(51) Int. Cl.
*G06F 9/45* (2006.01)
(52) U.S. Cl. ...................................................... 717/107
(58) Field of Classification Search ................ 717/107, 717/104
See application file for complete search history.

(56) References Cited

U.S. PATENT DOCUMENTS
6,269,473 B1 * 7/2001 Freed et al. ................. 717/104

FOREIGN PATENT DOCUMENTS
EP          0453152 A2     10/1991
WO         WO 99/45464      9/1999
WO         WO00/14629       3/2000

* cited by examiner

*Primary Examiner*—John Chavis
(74) *Attorney, Agent, or Firm*—Jacobson Holman PLLC

(57) ABSTRACT

A flexible component-based software system is developed by generating a UML model (3) in a specification phase (4). Components are generated in an implementation phase (4). The UML model (3) is transformed to a meta model. A runtime architecture service (RAS, 10) dynamically assembles a system in runtime according to the meta model. A modelling tool (15) modifies the meta model via an API (34) and a meta modeller (31). This allows dynamic re-configuration of the system.

23 Claims, 13 Drawing Sheets

*Component Type Modeling*

*Component type modeled as complex component type*

*DOM Object Model*

*The Type Model*

*Instance Model*

SOFTWARE DEVELOPMENT PROCESS

FIELD OF THE INVENTION

The invention relates to a process for development of a flexible component-based software system, and to a system developed by such a process.

PRIOR ART DISCUSSION

A software system is generally regarded as "flexible" if it can undergo modification with relative ease in order to accommodate new requirements. This change may be effected via a restructuring of the interactions of its functional elements and/or the replacement of existing elements with alternates or via the addition or removal of elements.

Flexibility is of benefit in a system which is required to operate in an environment which undergoes change. Not all systems are required to be flexible. However, in general, flexibility and the reduction of the cost of providing flexibility are often considered to be of benefit.

The principal difficulty in delivering flexible software has long been known: strong couplings or bindings between code modules act to limit their viable independent usage, and lock the modules together in ways that are difficult to manipulate. Object oriented technologies are based on strong couplings between objects based on the references. That these references are created and destroyed empirically, within functional code, in an intermingled fashion, further hardens the linkage. This is exacerbated by the fact that it is a compile-time linkage. This leads to high costs when restructuring interactions between tightly coupled modules. Reuse and perhaps more importantly, changing a system's behaviour is not possible without inspection and modification of code, an expensive process.

PCT Patent Specification No. WO00/14629 describes a method for generating a system, in which a meta model is initially developed. This is transformed into an application model, which is in turn transformed to code. Code for client/server interfaces is also generated. The structure of the meta model reflects that of the end-product system and it is used as a starting point, providing structure for the overall production process.

Attempts have been made to improve flexibility in software. An example is a message-based technologies in which systems are constructed as anonymous peers which exchange messages via an intermediary. Another approach is to use a naming service which allows services to be named abstractly. However, these approaches provide limited flexibility because the components have a flat peer-to-peer structure which it is difficult to implement realistic system architectures.

Another approach has been the development of Service Oriented Architecture (SOA). SOA models provide a component-oriented paradigm which views enterprise level software components as providers and consumers of business services. This is an example of component technology. However, the extent of flexibility is limited because this technology does not allow modification of interactions between components, without re-engineering at the code level.

OBJECTIVES OF THE INVENTION

The invention is described towards providing a development process which produces a software system having improved flexibility.

SUMMARY OF THE INVENTION

According to the invention, there is provided a process for development of a software system, the process comprising the steps of defining a meta model and using the metal model to generate executable code, characterised in that,
 the process comprises a step of storing components each having executable code;
 the meta model has a hierarchical structure defining how a system is to be assembled by instantiating components in runtime; and
 the system is completed by dynamically instantiating the components in runtime according to the meta model.

In one embodiment, the meta model is generated from a design model arising from a specification phase, the design model specifying the system in terms of components and their interactions.

In another embodiment, the design model is represented as a markup language file.

In a further embodiment, the meta model is saved to storage by transforming it back to an associated design model in said markup language.

In one embodiment, the design model models the system declaratively as a graph of instances of component types and allowed interactions between them.

In another embodiment, the design model models a component type as an abstraction that specifies interfaces supported by a component and interfaces that a component requires.

In a further embodiment, a component type is specified as a specialisation of another component type.

In one embodiment, a component type specifies how a plurality of component types may be aggregated to form a composite component type, and in which the composite component type is modelled as a template.

In another embodiment, channels between component instances are templated such that they can be bound to specific interface types on subsequent reuse of the templated component type.

In a further embodiment, the meta model is generated by parsing the design model to generate a hierarchical graph of connected objects.

In one embodiment, the parsing generates a token stream arising from lexical analysis, the token stream representing markup language elements and attributes.

In another embodiment, the token stream is parsed in a plurality of passes comprising:
 a syntactic parsing pass to create meta model objects;
 a linking parsing pass to create links between objects based on defined bidirectional associations;
 a pass to refine the objects according to stereotypes; and
 a pass to perform semantic model validation for correct behaviour.

In one embodiment, the stereotypes include:
 a component type stereotype;
 a realisation stereotype to extend abstraction; and
 an interface requirement stereotype.

In one embodiment, the meta model comprises:
 a type model comprising a specification of the types of components; and
 an instance model which instantiates the type model set into runtime components.

In one embodiment, the type model specifies component types in terms of interfaces and in terms of services implemented by components, and in which the interfaces are those supported by a component and those of services that component requires.

In another embodiment, the invention comprises the further step of maintaining the meta model and dynamically modifying the system by modifying the meta model, and re-instantiating the components according to the modified meta model.

In one embodiment, the meta model is modified by a modelling tool and an API, the tool having a model view pattern on the meta model.

In another embodiment, the dynamic modification of the meta model comprises dynamically changing the number and identity of component instances, component types, and their interactions.

In one embodiment, the meta model is dynamically modified by generating a fresh or modified design model, transforming the design model to a meta model, and re-assembling the system according to the new meta model.

In another embodiment, the meta model automatically performs self type-checking before assembly of the system.

In one embodiment, the system assembly is performed by a technology-independent activation manager and at least one technology-specific activator, in which the activation manager directs at least one activator to:
  instantiate components,
  bind components, and
  unbind components.

In one embodiment, the activation manager is an object which presents public methods for instantiating components, for binding components, and for unbinding components, and in which the activation manager instantiates technology-specific components by:
  retrieving a technology identifier;
  searching a list of currently instantiated technology-specific activators and identifying one having the same technology identifier; and
  said activator instantiating a component.

According to another aspect, the invention provides a process for development of a software system, the process comprising the steps of defining a meta model and using the metal model to generate executable code, characterised in that,
  the process comprises a step of storing components each having executable code;
  the meta model has a hierarchical structure defining how a system is to be assembled by instantiating components in runtime;
  the system is assembled by dynamically instantiating the components in runtime according to the meta model;
  the meta model is generated from a design model arising from a specification phase, the design model specifying the system in terms of components and their interactions;
  the meta model is maintained and the system is dynamically modified by modifying the meta model and re-instantiating the components according to the modified meta model, wherein the meta model is modified by a modelling tool and an API, the tool having a model view pattern on the meta model.

According to a still further aspect, the invention provides a software system comprising components having executable code, characterised in that the system further comprises:
  an adapter comprising means for generating a meta model from a design model, the meta model defining how the components are to be instantiated in runtime;
  a meta modeller comprising means for maintaining a meta model during runtime;
  an activation sub-system comprising means for dynamically instantiating the components in runtime according to the meta model.

In one embodiment, the system further comprises a modelling tool comprising means for interacting with the meta modeller to modify the meta model, and the activation sub-system comprises means for re-instantiating the components for dynamic modification of the system.

In another embodiment, the meta modeller comprises means for maintaining the meta model with:
  a type model comprising a specification of the types of components; and
  an instance model which instantiates the type model set into runtime components.

In one embodiment, the activation sub-system comprises a technology-independent activation manager and at least one technology-specific activator, in which the activation manager comprises mean for directing at least one activator to:
  instantiate components,
  bind components, and
  unbind components.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Figure 1:
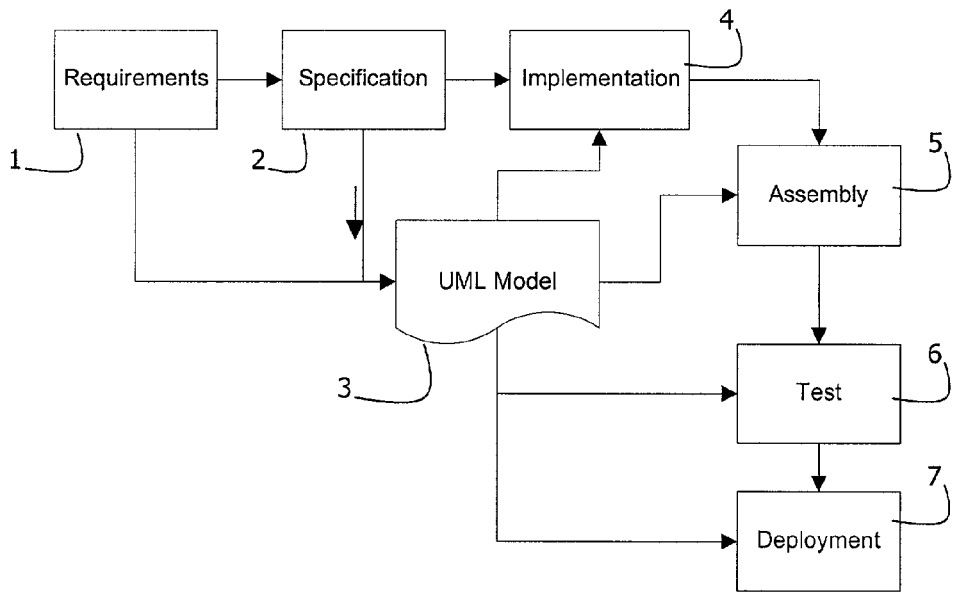
FIG. 1 is a high level diagram illustrating a software development process of the invention.

FIG. 1 illustrates a development process as a set of development phases. In an iterative development process it may be assumed that these phases will occur in parallel as iterations progress. Software development begins with a requirements phase 1, in which the system's business requirements are defined, leading to a series of Unified Modelling Language (UML) use cases and other supporting documentation. In a second phase, specification 2, the system architecture is defined. Its output is a UML model 3 which models component types, subsystems, and the overall architecture of the system, in terms of dependencies between components. An implementation phase 4 generates components to be used in the system. The UML model is a design model which drives the implementation by specifying the required component types. An assembly phase 5 binds the components to form the required software system. Testing 6 and deployment 7 are the final stages in the development process. The invention is concerned primarily with the specification and assembly phases 2 and 5.

Figure 2:
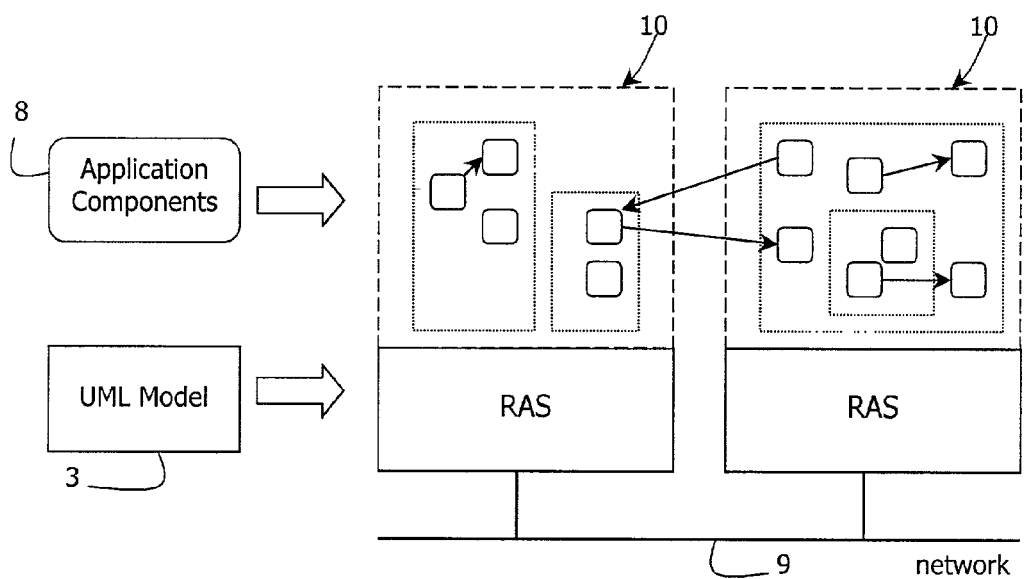
FIGS. 2 and 3 are diagrams showing execution of the system.

FIG. 2 illustrates execution of a software system which is generated. A software system consists of the UML model 3, and a set of components 8 constructed during the implementation phase 4. To complete the software system (during runtime), the UML model 3 is passed to a Runtime Architecture Service (RAS) 10, two of which are illustrated on a network 9. The RAS 10 performs a first part of the assembly phase 5 by parsing the UML model 3 to extract that architectural information necessary to instantiate the system. This information is modelled as a meta-model, which performs a semantic analysis (checking for completeness for example). The meta-model has a hierarchical structure defining how components are to be instantiated in runtime. The meta-model is then executed, which results in instructions regarding instantiation, instance binding and dependency establishment being passed to an activation layer. The activation layer transforms technology-neutral instructions into technology-specific actions, which it performs by accessing the technology-specific details in the meta-model. It assembles the system by instantiating, loading, and binding components drawn from the component set 8. The end result is a software system, structured as a set of components configured so that the overall system architecture matches the design contained in the meta-model, and therefore, the loaded UML model 3.

Figure 3:
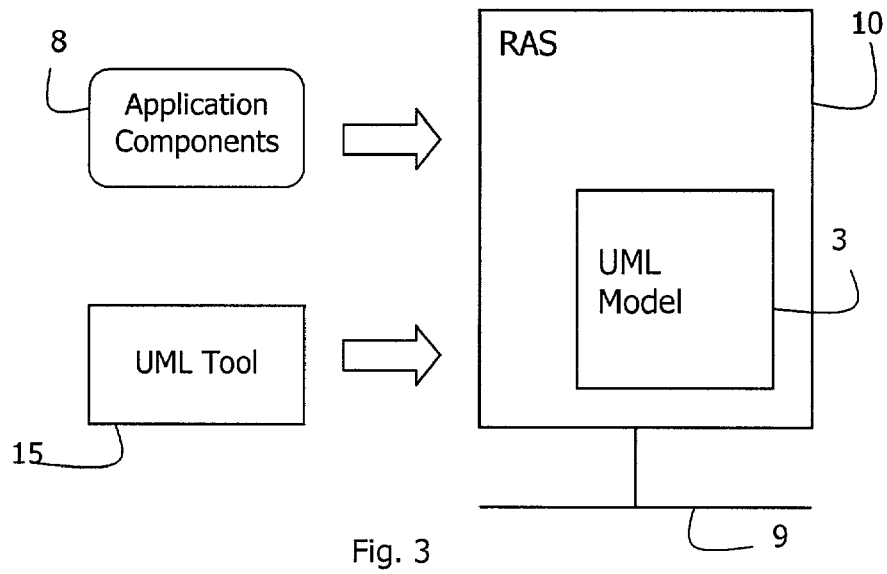

Referring to FIG. 3, the RAS 10 loads and saves UML models 3 as XMI files. As stated above, the RAS 10 generates a meta model from each UML model 3. Each meta model is a hierarchical structure, and may be edited/manipulated by a UML tool 15 via an API. This is performed in a user-friendly manner as the tool 15 provides a view on the meta model, and provides methods for opening, closing, and type correct manipulation. When the RAS 10 saves a meta model it takes the form of the corresponding UML model 3 in an XMI file. The meta model may thus be regarded as an object representation of the UML model 3.

During execution of a system, the RAS 10 maintains the meta-model associated with the executing system. During this phase, the meta model remains accessible to the UML tool. Changes made to the meta model have immediate effect on the executing system by addition, removal and/or replacement of components, and changes to the structure of the bindings between instances according to changes to the meta model.

In the following, the invention is described in more detail.

UML Model 3

Figure 4:
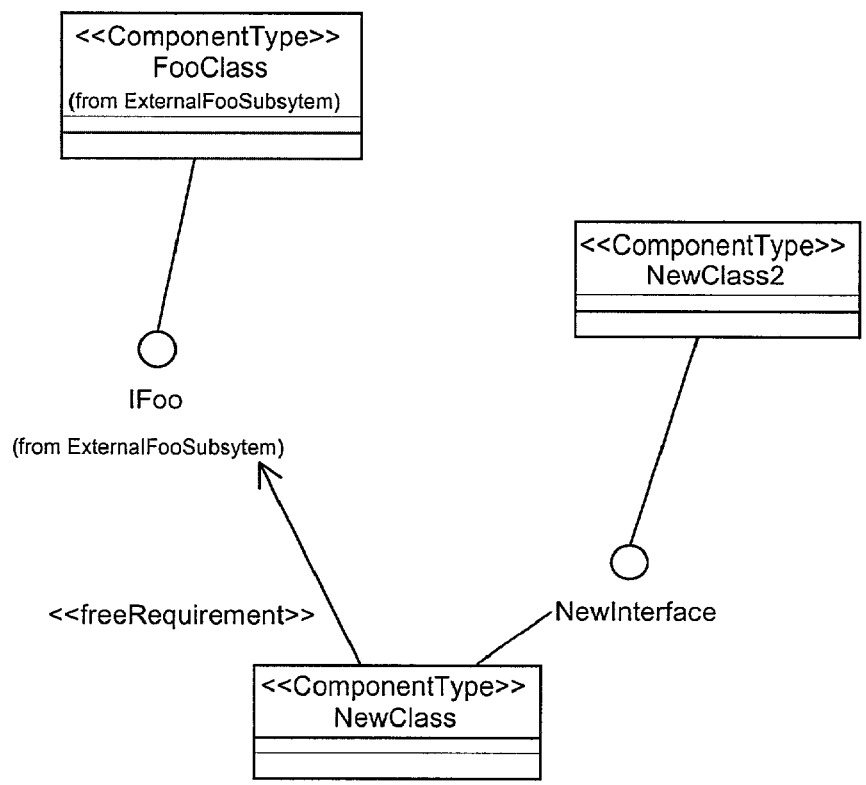
FIGS. 4, 5, and 6, are diagrams illustrating components and how they are modelled.

In the requirements and specification phases 1 and 2 the system design is modelled. In the preferred embodiment, this model comprises a series of UML diagrams. The model is developed by the UML tool 15 and recorded in a file in an XMI/XML form. A number of different UML model diagrams are used to record different aspects of the desired system. The UML model 3 primarily comprises UML class diagrams and object instance diagrams. Class diagrams define component types in terms of interfaces a particular component provides, and interfaces a component uses (as illustrated in FIG. 4). The former details services implemented by the component. The latter details services not implemented by the component, but required for its correct execution. A component type is modelled abstractly, and independent of any particular implementation. An interface is modelled in UML as a set of parameterized methods and attributes. Interfaces and component types are both modelled as stereotyped classifiers in the preferred embodiment. The concepts can be modelled in a declarative textual language in an alternative embodiment.

Component types can be defined as a specialisation of other component types, with object-oriented inheritance rules applying. A child component type is defined by the declaration of provided and required interfaces of the parent or parents in addition to those defined in the child component type itself. Interfaces can be defined as a specialisation of other interfaces with object-oriented rules applying.

Figure 5:
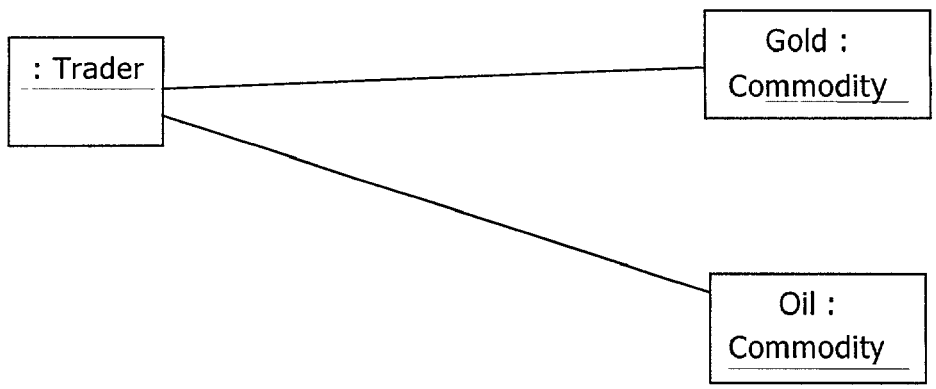

What results from the UML Class diagrams is a model of the types of components and how these depend on a set of interfaces. These type descriptions are used in a further set of UML Object Instance diagrams that describe how component objects which realise these types are to be connected to each other in the running system on each other, as illustrated in FIG. 5(*a*).

A component represents one or more than one (if annotated with cardinality other than one) instance of a component at runtime. This modelling does not imply a particular realisation of the component object by a particular implementation. Unless further annotated, a component is understood to represent an instance of any implementation that realises its type. This annotation is a necessary part of completing the modelling necessary in the invention and is described below. Note also that more than one component instance can be typed with the same component type, and that this implies nothing more than type equivalence between possible realisations of these component objects. The connections allowed between instances on an object instance diagram are constrained to typed interfaces that match a service provision by one component to a service requirement by the other component. This connection can be associated with a single interface, a subset of all allowed interfaces, or all allowed interfaces.

Figure 5B:
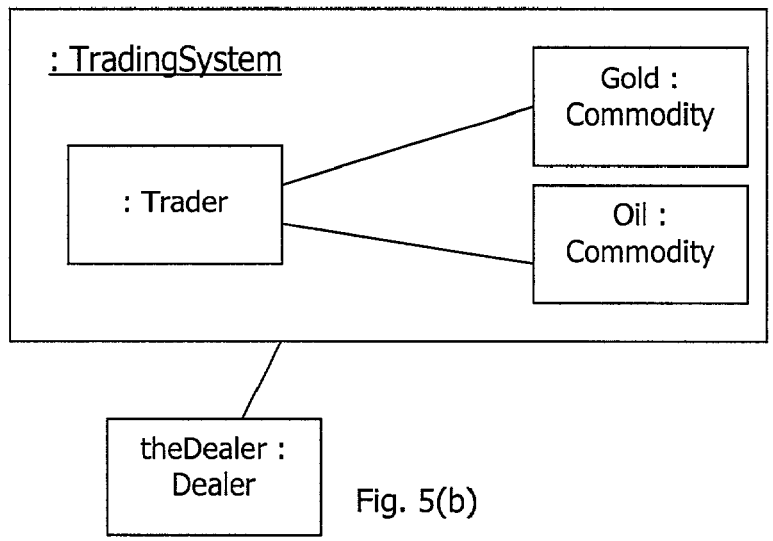
Figure 6:
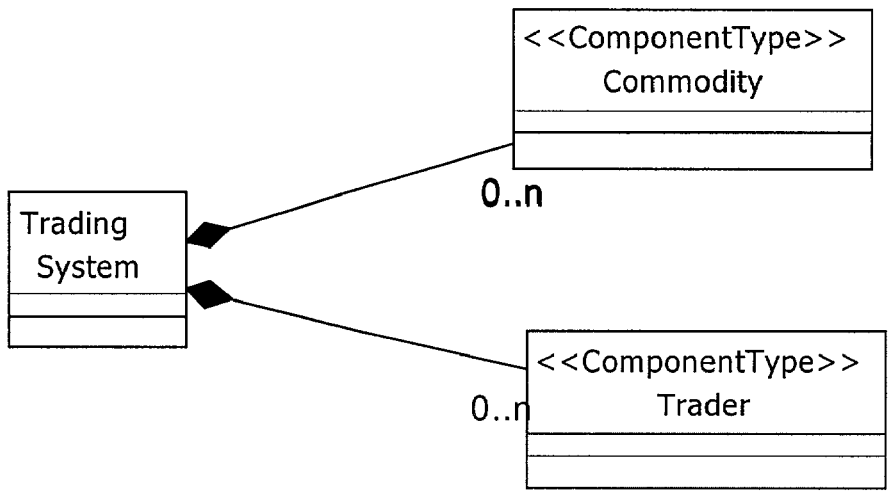

The component type is also used in the modelling of "Complex Component Type," which is a model of how a set of instances of component types can be bound together to behave as a single component (FIG. 6). Such a complex component will behave as if it were a single component. The Complex component type modelling describes the required and provided interfaces of the type, the types of sub-components that will go to make up the aggregate, and a modelling of how the interface requirements and provisions of these sub-components map to the requirements and provisions of the composite whole. The purpose of this is to support the modelling of a typed subsystem as an assembly of other subsystems. As shown in FIG. 6, any component object's type may itself be modelled as a complex component type, and so on, so that what results is a hierarchical graph of relationships between typed object instances, terminating at the leaf nodes of this hierarchy with component objects typed by immutable, simple component types that describe service provision and requirement only. An equivalent extended object instance modelling (see FIG. 5*b*) is necessary to detail the aggregate.

Aspects of a component type may in addition be modelled as templated features. In a complex component type, specific types may be bound to the component type's graph on subsequent reuse of the templated component type. This allows component objects to be specified initially as untyped. The identity of component objects may be likewise templated and subsequently bound on specialisation, so that a particular instance in a child component type can be associated with the templated instance in the parent. Required and provided services associated with a component type may be likewise templated, and bound subsequently on reuse of the type.

The UML model 3 is used to model a component architecture that is abstract, and independent of any particular implementation of the component objects specified in the model. This model is augmented with further modelling (typically packaged as a separate set of diagrams) that associate component instances in the UML model 3 with component implementations, developed in phase 4. Any type-compatible complex component type can be likewise associated, in which case the complex component type is treated as a component implementation and is instantiated at runtime. A component implementation may be associated with more than one component instance in a single component type. A component instance marked as a set may also be associated with a plurality of component implementations.

Components implemented in phase 4 are implemented with an interface-based component technology, which is capable of implementing a type that is compatible with the component type of a component instance, in terms of provided and required services. The component technology must provide the runtime system with configuration capability with respect to the identity of providers of service requirements. In one embodiment, Microsoft's COM™ technology is provided as an example of a technology that employs a connection point model, supported by COM interface definition language, which provides the necessary capability. An embodiment based on .Net is also described in detail in the discussion of runtime support.

Runtime Architecture Service 10

Figure 7:
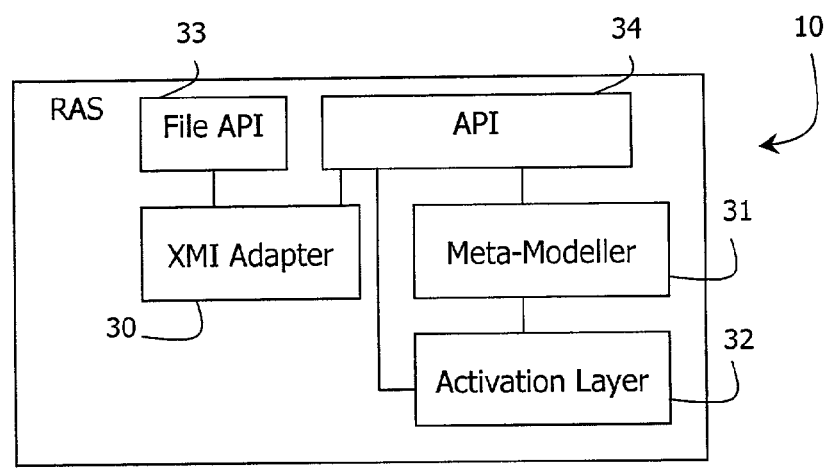
FIG. 7 is a diagram illustrating structure of a Runtime Architecture Service (RAS)

FIG. 7 illustrates the architecture of the Runtime Architecture Service (RAS 10) of the invention. It comprises an XMI adapter 30, a meta-modeller 31, an activation layer 32, a file interface 33, and an API (application programming interface) 34.

XMI Adapter 30

The XMI adapter 30 creates a hierarchy of objects from an XMI file, and allows modifications, and the generation of an XMI file. This object set forms a hierarchical graph of connected objects, called the meta model. The XMI objects irrelevant to the execution of the software system are retained and saved back to the file. The meta model is maintained by the meta modeller 31, which allows it to be subsequently modified via the API 34 as described below.

Figure 8:
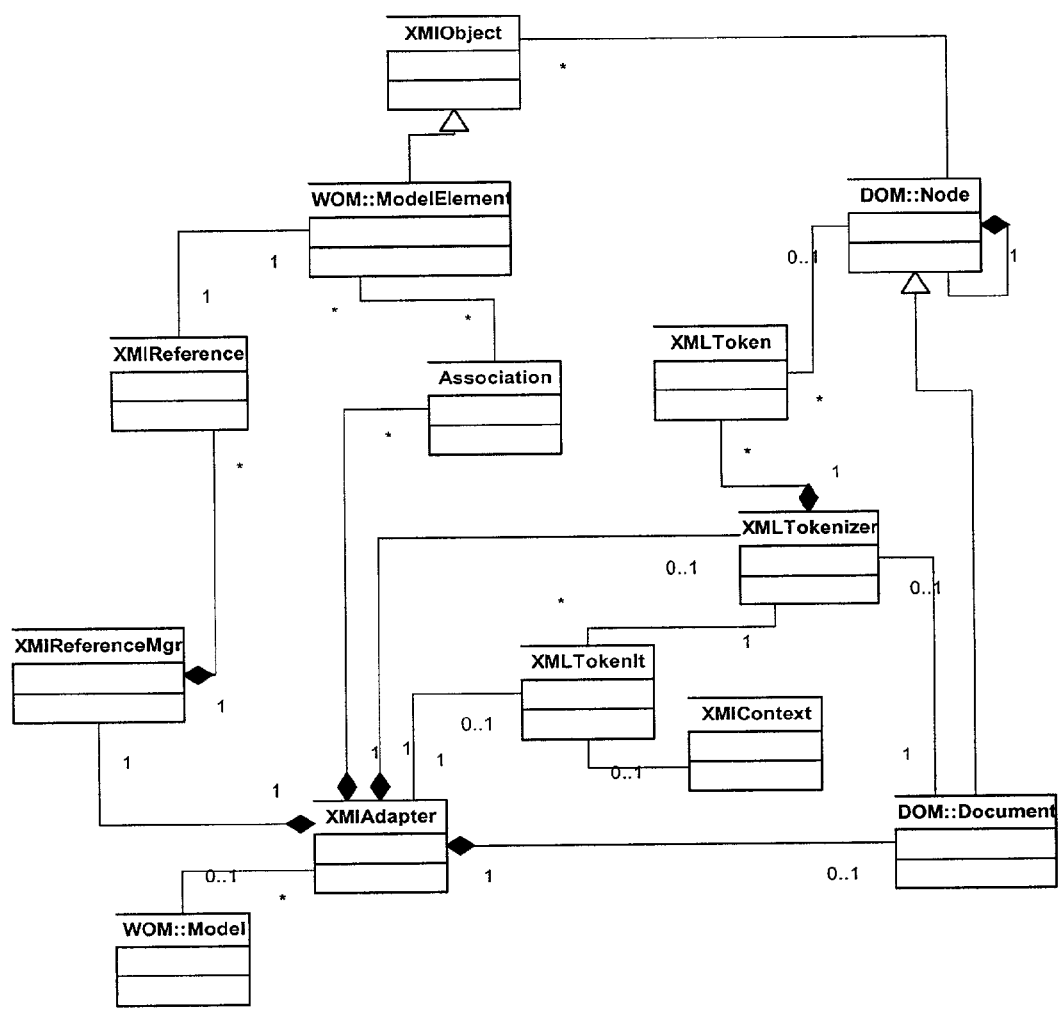
FIG. 8 is a class diagram of an XMI adapter of the RAS.

FIG. 8 illustrates the structure of the XMI adapter 30, in which the term "meta model" is also represented by the name "WOM". The external interface to the adapter 30 is represented by an XMIAdapter class. This class allows the caller to load and save models and add and delete model elements. The objective of the adapter 30 is to create objects based on UML meta-model classes. From a parsing perspective a meta-model class has:

Attributes. The parser maps these to member variables.

Associations. Multiplicity of "single" generates a pointer to another object, "many" generates an array of pointers.

Compositions. Multiplicity of "single" generates a pointer to another object, "many" generates an array of pointers.

Figure 9:
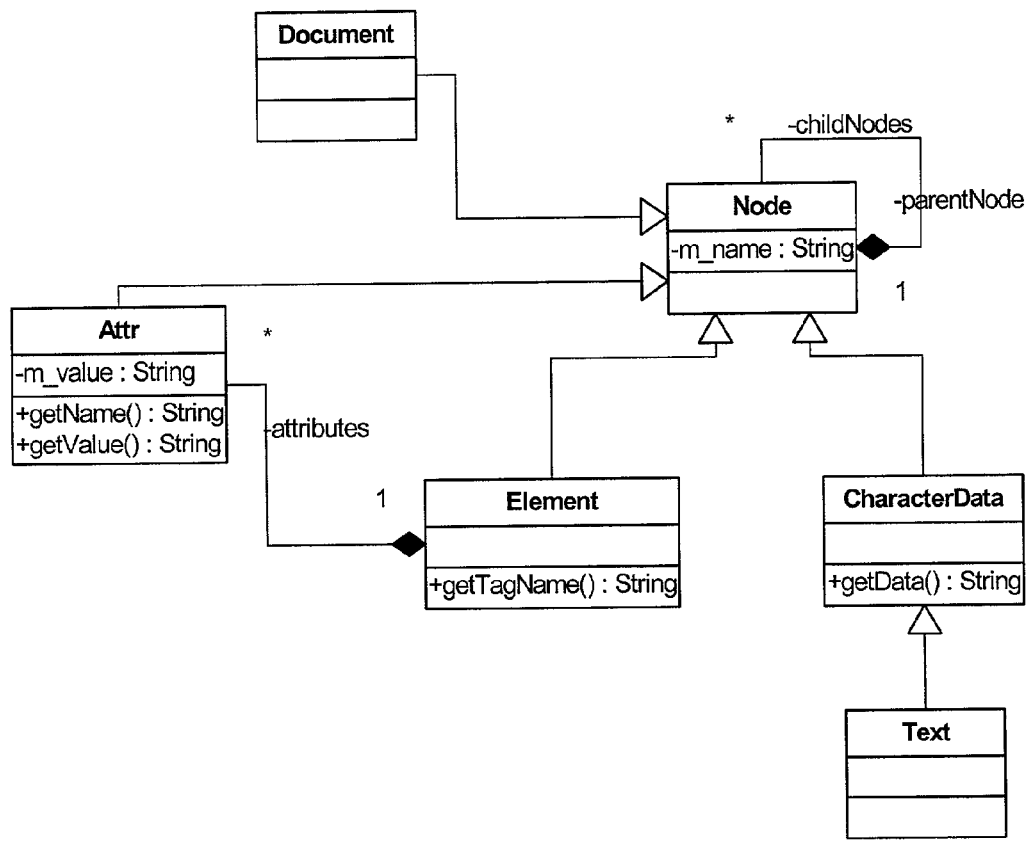
FIGS. 9 to 14 are class diagrams illustrating various aspects of the system.

A pointer back to a document object model (DOM). The principal types of the DOM are shown in FIG. 9. The DOM is generated initially from the XMI file and is used as the basis for further development of the meta model.

Parsing

Parsing of a UML model begins with lexical analysis, which generates a token stream. The token stream is then processed by the parser language, implemented as a hierarchy of XMIObject child classes. A component of the Adapter called a tokenizer operates on the DOM tree that is created by processing an XMI file. The tokens are defined by the class XMLToken. The XMLTokenizer class is iterated using the XMLTokenIt class.

In order to build a graph of UML meta-model objects, the parsing of the token stream is performed in four passes as described below. The description refers to the following XMI model:

```
<UML:Model xmi.id = 'G.0' >
    <UML:Namespace.ownedElement>
        <UML:Interface xmi.id = 'S.1' name = 'Foobar' >
            <UML:ModelElement.supplierDependency>
                <UML:Abstraction xmi.idref = 'G.3' />
            </UML:ModelElement.supplierDependency>
            <UML:Namespace.ownedElement>
                <UML:Generalization xmi.id = 'S.10' child = 'S.1'
                    parent = 'S.2' >
                    <UML:ModelElement.isSpecification>
                        true
                    </UML:ModelElement.isSpecification>
                </UML:Generalization>
            </UML:Namespace.ownedElement>
        </UML:Interface>
    </UML:Namespace.ownedElement>
</UML:Model>
```

Figure 10:
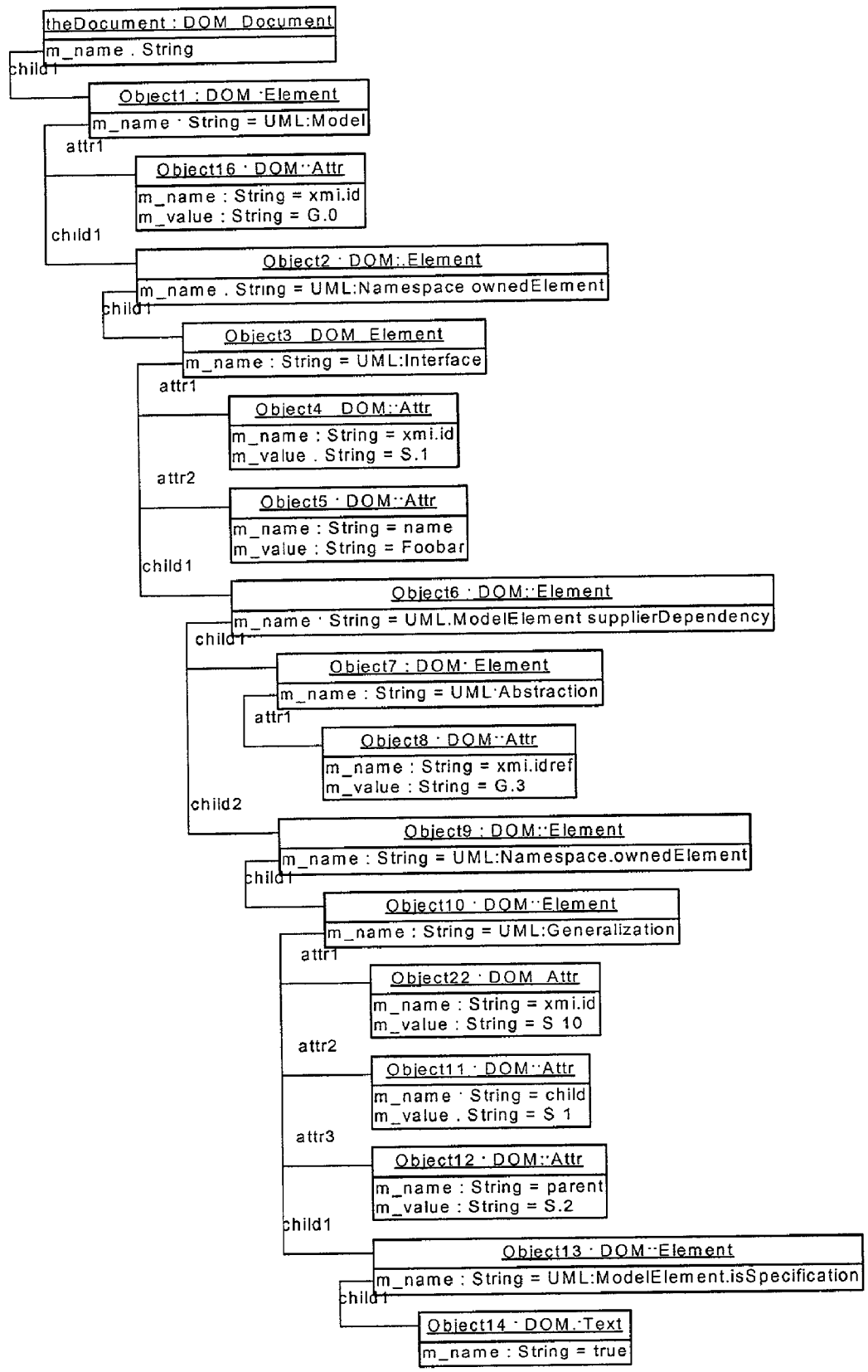

FIG. 9 illustrates the principal types in the DOM. FIG. 10 illustrates the Document Object Model (DOM) representation of the example XMI model. After tokenization, the following token stream will have been generated from the DOM model of FIG. 10:

```
{   { XML_ELEM_START, "UML:Model", NULL, 0x???? },
    { XML_ATTR, "xmi.id", "G. 0", 0x???? },
    { XML_ELEM_START, "UML:Namespace.ownedElement", NULL, 0x???? },
    { XML_ELEM_START, "UML:Interface", NULL, 0x???? },
    { XML_ATTR, "xmi.id", "S.1", 0x???? },
    { XML_ATTR, "name", "Foobar", NULL, 0x???? },
    { XML_ELEM_START, "UML:ModelElement.supplierDependency", NULL, 0x????
},
    { XML_ELEM_START, "UML:Abstraction", NULL, 0x???? },
    { XML_ATTR, "xmi.idref", "G.3", 0x???? },
    { XML_ELEM_END, "UML:Abstraction", NULL, 0x???? },
    { XML_ELEM_END, "UML:ModelElement.supplierDependency", NULL, 0x????
},
    { XML_ELEM_START, "UML:Namespace.ownedElement", NULL, 0x???? },
    { XML_ELEM_START, "UML:Generalization", NULL, 0x???? },
```

```
        { XML_ATTR, "xmi.id", "S.10", 0x???? },
        { XML_ATTR, "child", "S.1", 0x???? },
        { XML_ATTR, "parent", "S.2", 0x???? },
        { XML_ELEM_START, "UML:ModelElement.isSpecification", NULL, 0x???? },
        { XML_VALUE, NULL, "true", 0x???? },
        { XML_ELEM_END, "UML:ModelElement.isSpecification", NULL, 0x???? },
        { XML_ELEM_END, "UML:Generalization", NULL, 0x???? },
        { XML_ELEM_END, "UML:Namespace.ownedElement", NULL, 0x???? },
        { XML_ELEM_END, "UML:Interface", NULL, 0x???? }
        { XML_ELEM_END, "UML:Namespace.ownedElement", NULL, 0x???? },
        { XML_ELEM_END, "UML:Model", NULL, 0x???? }
}
```

Pass 1

Pass 1 does syntactic parsing of the token system to create the meta model objects. XMI stores a UML model in a hierarchical form, and the parser language is also hierarchical. The objective of this language is for each level to define valid attributes, associations, and compositions. Compositions are nested elements and define the next level in the hierarchy. A parser language class inherits from XMIObject and implements the ProcessXMI( ) function. The ProcessXMI( ) function uses a number of Exchange functions to determine what elements will be parsed and generated at this level. The pseudo-code below illustrates how the parse process works, in which "ProcessXMI" is a method called to start processing or saving, and "ExchangeComposite" is a method to create composite objects.

Pass 3

Pass 3 creates refined meta model specific objects. The meta model uses a number of stereotypes to extend the meta-model. In order to be able to represent the meta-model objects the meta model classes are logically inherited from an existing meta-model class and don't add any attributes or associations that need to be stored persistently. Pass 3 iterates the relevant stereotypes and creates the meta model objects. The following stereotypes are relevant:

ComponentType. This stereotype extends Class to create the meta model type ComponentType.

Realisation. This is a UML stereotype that extends Abstraction to create the meta model type Realisation.

InterfaceRequirement. This stereotype extends Association to either create the meta model type FreeRequire-

```
Main()
{
        domTree = DomThatSucker()
        rootObject = new Root
        xmiContext = new XMIContext(domTree)
        while not xmiContext.tokenIt.AtEnd()
                rootObject->ProcessXMI (xmiContext)
}
Root::ProcessXMI(XMIContext ctx)
{
        ExchangeComposite (ctx, "UML:Model", single, m_model,
        typeid(Model), "UNL:Root")
}
Model::ProcessXMI (XMIContext ctx)
{
        ExchangeComposite (ctx, "UML:Namespace.ownedElement",
        "UML: Interface", multiple,
    m_class, typeid(Class), "UML:Model")
}
Interface::ProcessXMI (XMIContext ctx)
{
        ExchangeAttribute (ctx, "name", "UML:ModelElement.name", m_name)
        ExchangeAssociation (ctx, "supplierDependency",
        "UML:ModelElement.supplierDependency",
        single, m_supplierDependency, typeid(Abstraction),
        "UML:Dependency.supplier")
}
```

Pass 2

Pass 2 creates the links between objects based on the defined associations. Associations are XMI references that are resolved to the actual objects. All associations in the meta model are bidirectional and instantiation of the model uses bi-directional links. Both ends of an association are not necessarily provided in XMI so the first end that is encountered ensures that the other end is setup also.

ment or ConstrainedRequirement. A ConstrainedRequirement is created if one of the association ends has an interface specifier.

Pass 4

Pass 4 performs semantic model validation on meta model objects. The stereotypes imply a certain behaviour that is impossible to enforce in another tool. Pass 4 verifies that the correct behaviour has been modelled. The following parser helper methods are used by the XMIAdapter.

Method: ExchangeAttribute
   This function maps an XMI attribute to a variable.
   ExchangeAttribute(XMIContext ctx, string attrTag, string elemTag, string &member)

ExchangeAssociation
   This function maps an XMI association to a variable.
   ExchangeAssociation(XMIContext ctx, string attrTag, string elemTag, Multiplicity mult,
      Association &member, type_info &typeInfo, string assocTag)

Exchange Composite
   This function creates composite objects.
   ExhangeComposite(XMIContext ctx, string attrTag, string elemTag, Multiplicity mult,
      Composition &member, type_info &typeInfo, string compTag)

Meta-Modeller 31

The meta-model maintains an object-oriented representation of the UML model. All semantic checking and execution is driven by this meta-model and it maintains a live monitoring role for the executing system. The meta-model consists of a set of discrete model sets described below.

Type Model

Figure 11:
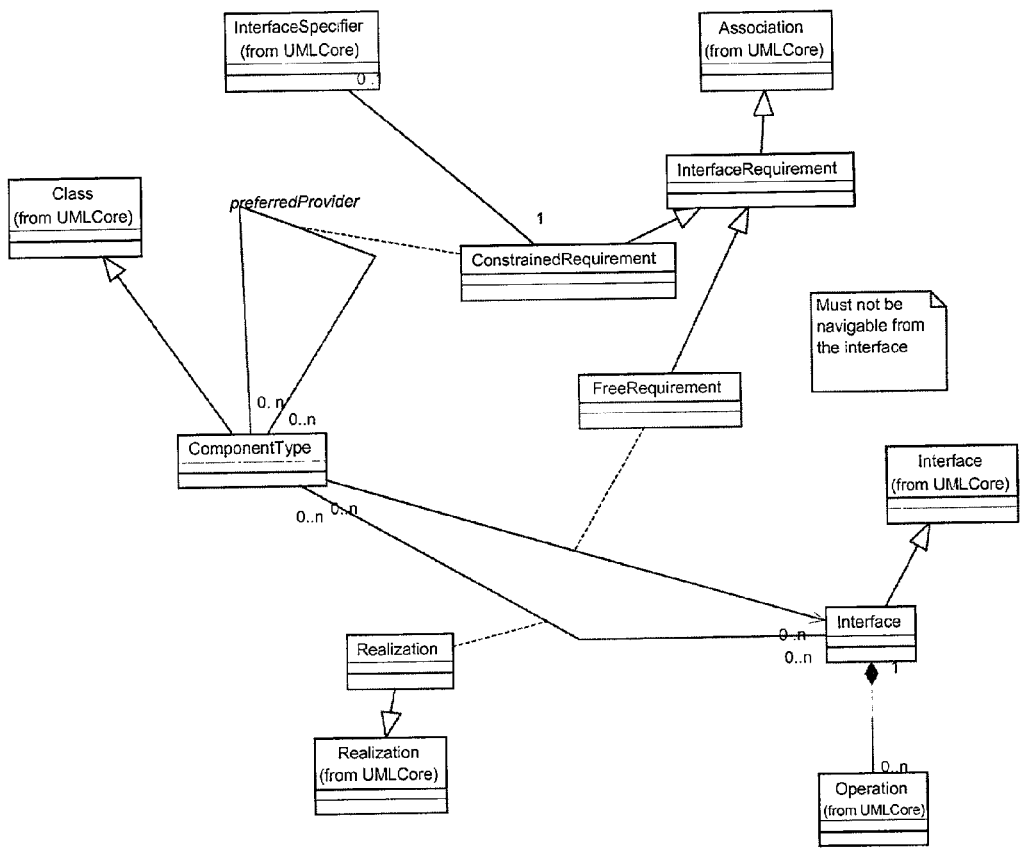

FIG. 11 shows the UML type model of the meta model. The classes in this model are sufficient to record the types in an application, set of applications, set of libraries or any other modelled system. It principally includes the ComponentType class and the Requires relationship. The interface class is shown as a trivial extension of the UML class, purely to make it appear as part of the type model. A populated version of the type model set comprises a specification of the types of components to be used to build an application and the interfaces to be supported by the components.

An instance of the type model cannot be executed: This is because of two limitations:
1. The type model contains abstract information. So the types in a type model do not have a CLSID or COM extension.
2. The type model does not specify how many instances of each of its types are in a particular application. There could be, zero, one or any other number. Also, the type model allows some flexibility about which components can and must be linked together. The instance model provides this information and contains links back the classes in the type model.

A component type provides a specification of certain aspects of the structure of a component. As a type it provides information that is common to its instances. A component type knows about the interfaces it must provide, the interfaces it may use and the interfaces it must use. If a component type has a "preferred provider" for the interfaces it uses, it records that information. The Interface describes an abstract set of services provided by a component and required by another. A particular interface may be required by many components and provided by many. There is nothing to prevent a component from both requiring and providing the same interface. An interface may have many realisations. This is implemented with the standard UML realisation dependency.

Realisation captures the requirement from a component for an interface. If there is a preferred provider for the interface, RequiresFrom class is used, otherwise the Requires class is used. FreeRequirement is a requires association encapsulates the situation whereby a component type has a requirement for an interface. The ConstrainedRequirement (PreferredProvider) records the fact that the designer forces a component type to get a set of interfaces from another component type. The purpose of this class is to capture the two component types involved and the interface(s) referred to. It is like a 3-way association, but it is implemented as a 2-way association between the two relevant component types. The third part of the relationship (the interface) is captured by the standard UML Interface Specifier part of the association end.

Instance Model

Figure 12:
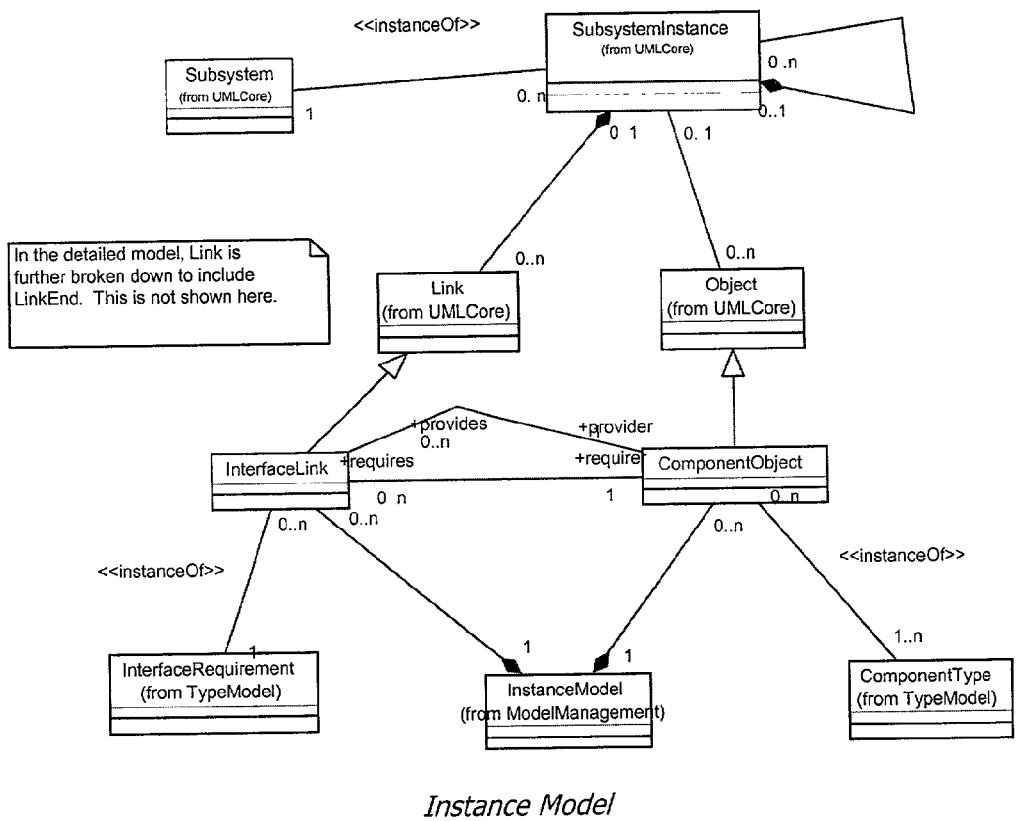

FIG. 12 shows a part of an instance model, which is part of the meta model. This instantiates the type model because it resolves which of the components are in the application, how many of each component there is, and the precise nature of their interconnections.

InstanceModel is a container with UML ownership relationships with instances and links. ComponentObject encapsulates the run-time behaviour of a component. Every application component that is statically declared is represented by one component instance. A ComponentObject is involved in relationships with other ComponentObject objects. It provides some interfaces to other component instances. It also obtains interfaces from other component instances. A ComponentObject is an instance of exactly one ComponentType. This provides the rules that govern its behaviour, i.e. which interfaces it provides and which it can use and must use. A ComponentObject is (indirectly) an instance of zero or more interfaces. This is because it is an instance of ComponentType, which realises Interface. In practice a component instance cannot have executable interfaces unless it is executable itself, but the design does allow this.

An InterfaceLink is instantiated when a three-way relationship is formed between two component instances and an interface. It is instantiated as a UML link element. The link element must connect two objects, (which are the component types) and must refer to an association (which is the interface requirement object).

Objects and links may optionally be part of a subsystem instance. The instance corresponds to the subsystem that their type information belongs to.

Activation Layer 32

Figure 13:
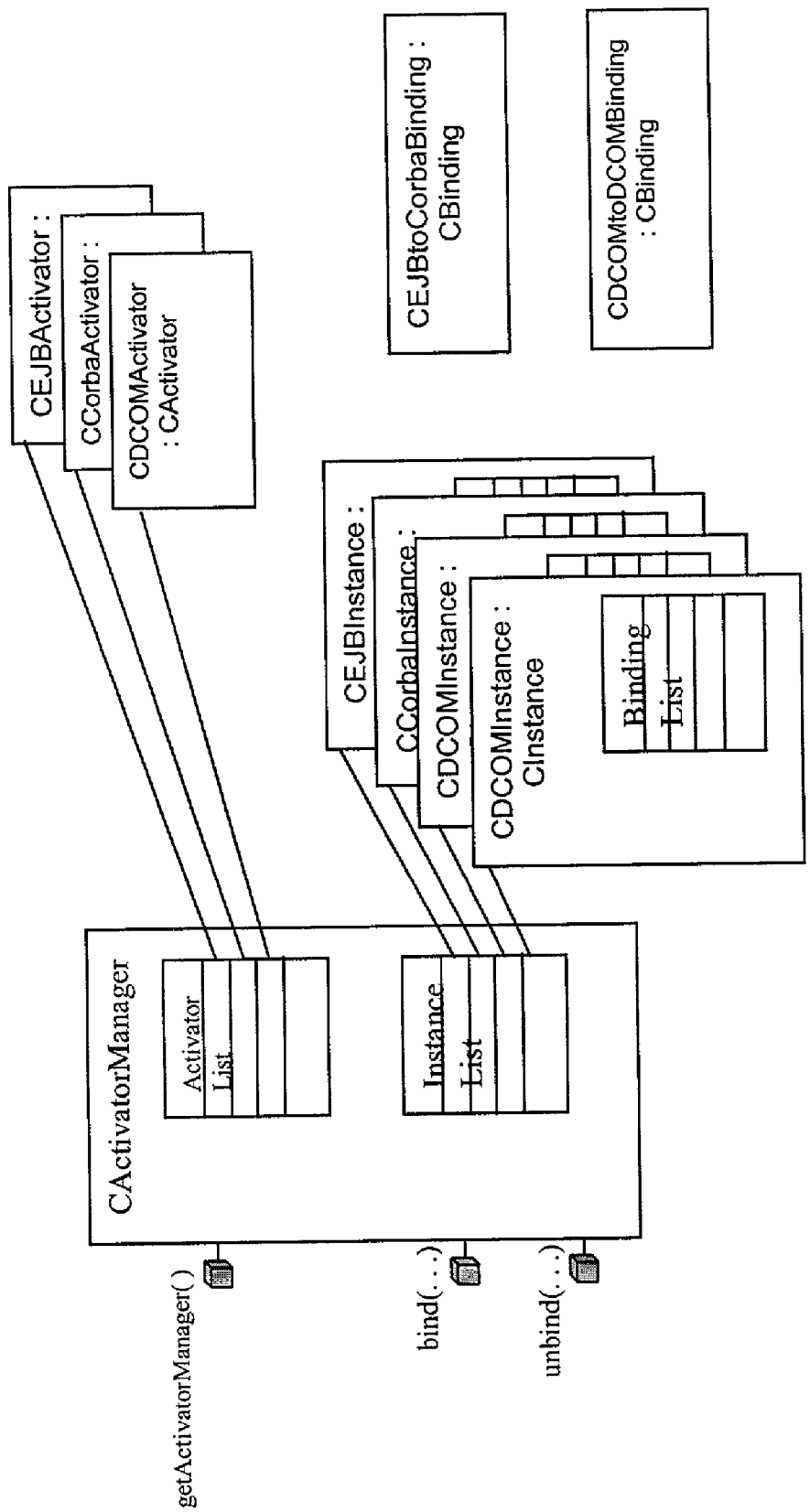

The meta-model is technology-neutral, in that it models UML entities that are not tied to particular component technologies such as COM, CORBA, or EJB, allowing technology-specific activation information to be associated with technology neutral component instance modelling. In contrast, the activation layer provides technology-specific modules capable of instantiating and configuring components implemented with specific component technologies. The overall structure of the activation layer is shown in FIG. 13.

The activation layer 32 comprises an Activation Manager and one or more Activators. The Activation Manager exposes a technology neutral interface that, with the meta-modeler 31, instantiates a software system and maintains runtime information about executing components. The Activators are used to instantiate and bind together technology-specific components. The components, their interfaces and the bindings between them are represented independently of their native technologies so that design can be manipulated without concern for the technologies involved.

The Activator Manager has four public methods (a) to (d):

(a) getActivatorManager ( ):
   Returns a static instance of the Activator Manager. This ensures that the returned Activator Manager is a singleton.

(b) instantiateComponent (CComponent*):

Instantiates the component described in the CComponent argument passed to it. The argument will not actually be a CComponent*, it will be a pointer to a class derived from CComponent. Once the ActivatorManager has instantiated the component, a CInstance pointer held by CComponent will be initialised. The CInstance class represents the instantiated component and is needed for future operations such as binding.

(c) bind (CInstance*, CInstance*, CInterface*):

Used to establish connections/bindings between components' interfaces. In any binding between components there will be an instantiated component that uses a service and an instantiated component that provides that service. Both "bind" and "unbind" require that the user CInstance* should be passed as the first argument and that the provider CInstance* is passed as the second argument.

unbind (CInstance*, (d) CInstance*, CInterface*)

Figure 14:
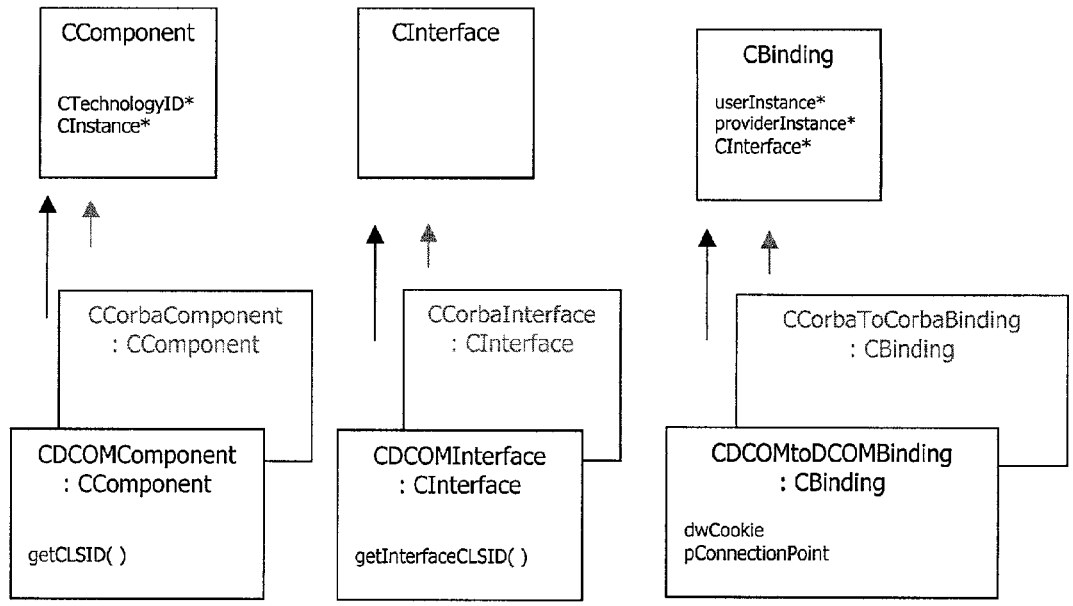

Technology-independence is achieved by representing the fundamental building-blocks of component-based design as generic class types passed as parameters in the methods above. The fundamental types are components, interfaces and bindings between components' interfaces. Technology-specific classes inherit from these classes. The parent types include pure virtual methods, which must be implemented by the children, which allow the Activation Manager to interrogate and extract technology specific detail from them. Child classes also implement further methods which are needed in a technology specific context, such as "get-CLSID" for DCOM. A similar relationship exists between CInterface and CDCOMInterface, and CBinding and CDCOMtoDCOMBinding. This is illustrated in FIG. 14.

When instantiateComponent( . . . ) is called, the following process takes place:

1. The ActivatorManager will call "getTechnologyID" on the CComponent.
2. With the returned string (e.g. "DCOM") the ActivatorManager will search a list of currently instantiated technology-specific Activators for an Activator with the same TechnologyID. An Activator with the same TechnologyID knows how to instantiate this type of component. If no such Activator is currently instantiated, the ActivatorManager will instantiate an appropriate Activator and add it to the list. When the correct Activator is found, ActivatorManager passes the CComponent* to it for instantiation.
3. The technology specific Activator will cast the CComponent* to a technology specific component type—such as CDCOMComponent*.
4. Since the technology specific Activator (CDCOMActivator) now has a CDCOMComponent* it can access the technology specific information contained within (e.g. via method calls such as "getCLSID"). With this information the CDCOMActivator instantiates the component. A reference to the DCOM component's IUnknown* is stored in a CDCOMInstance class which derives from a generic CInstance class. A pointer value to this generic instance is stored in the CComponent class which was passed to the CDCOMActivator and the function returns.
5. The ActivatorManager will now add a pointer to the CInstance of the newly instantiated component to a list of instantiated components.
6. The function returns TRUE to indicate that the instantiation succeeded. The CComponent's CInstance pointer has also been initialised.

Bindings occur when one component uses the functionality provided on the interface of another component. Bindings are performed between two component instances, and are qualified by an interface, all of which are provided as parameters. Technology specific bindings may require further information in order to manipulate them. These include, in the case of DCOM, a pointer to the ConnectionPoint object on the user-component and a DWORD cookie that is needed in order to destroy a binding.

To bind one component to another, the method bind( . . . ) is used. The user-component's CInstance* should be passed as the first argument and the provider-component's CInstance* as the second argument. Finally the interface that the user-component will use is passed as the third argument.

When CActivatorManager::bind is called the following process takes place:

1. The ActivatorManger calls the function bindToInterface (CInterface*, Cinstance*) on the user-component's CInstance*). The user-component's CInstance* will actually point to a technology specific class such as CDCOMInstance. However, this class implements the bindToInterface( ) function as it will be derived from the CInstance class which has a pure-virtual declaration of the bindToInterface function.
2. Since the bindToInterface function is implemented in the technology-specific class CDCOMInstance it will know how to bind together DCOM component instances. The function checks the TechnologyID of the provider instance and will setup the connection between the two instances.
3. Once the binding has been properly completed, the "bindToInterface" function creates a technology specific binding class (such as DCOMtoDCOMBinding) which contains all the necessary information to shut-down the binding between the two components.
4. A pointer to this technology-specific binding class is upcast to a CBinding*. This CBinding* is added to a list of bindings held by both CInstance classes. This means that each instantiated component has a CInstance class associated with it which contains a list of all its incoming and outgoing bindings (just one list). These lists are used for destroying bindings and for cleaning-up before shutting down component instances.

The activation layer 32 allows bindings to be destroyed. This means that one component will no longer use the provided interface of the other component. A binding can be destroyed dynamically by calling unbind( . . . ) and passing in the user instance and the provider instance along with the provided interface in the correct order.

Figure 15:
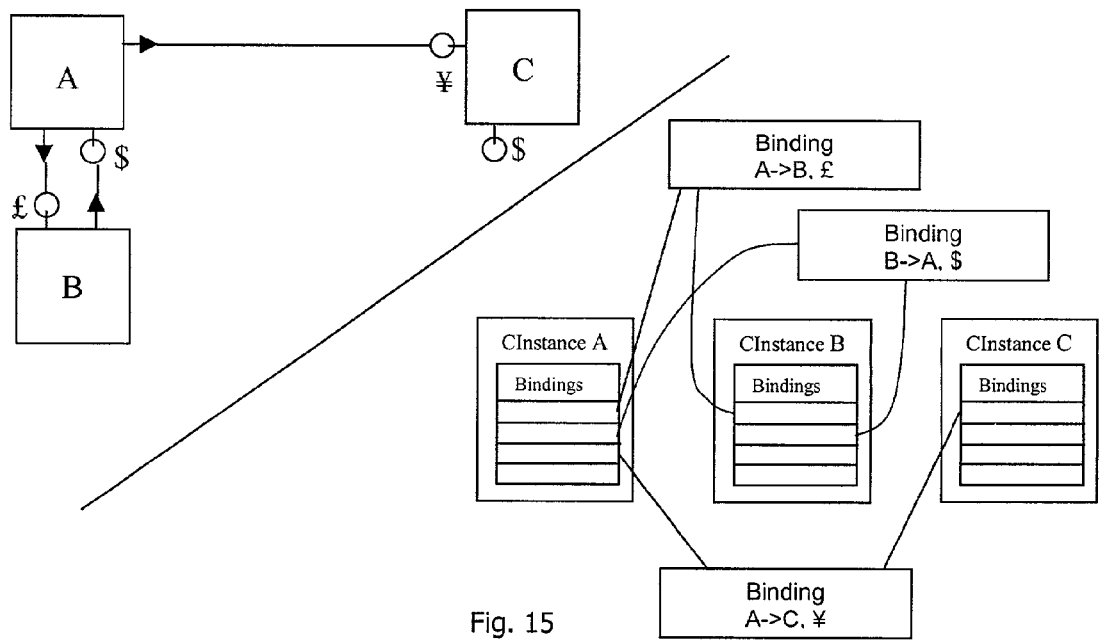
FIGS. 15 to 20 are diagrams illustrating binding and unbinding of components.

Consider the component-based system shown in FIG. 15. The bindings between components are stored in lists in the CInstance classes for each instantiated component.

The internal Activator process involved in unbinding is as follows.

1. CActivatorManager::unbind will call unbindFromInterface on the user-component's CInstance class passing in the provider CInstance* and the CInterface*. The user's CInstance will then search through its list of bindings for the relevant CBinding* object for this binding.
2. When the CBinding* is found the binding is deleted. This will call the destructor on the technology specific CBinding-derived object (such as CDCOMtoDCOMBinding).
3. The destructor of the CDCOMtoDCOMBinding object will shut down the connection between the two components (via DCOM calls to "Unadvise( )" and "Release( )").

4. Once the connection has been destroyed the CDCOM-toDCOMBinding destructor calls CInstance::removeBindingFromList(CBinding*) on both the user and provider CInstance classes, passing in a pointer to itself as the argument. This causes the CBinding* to be removed from the binding lists on both CInstance objects.
5. The functions then cascade-return to the caller.

Figure 16:
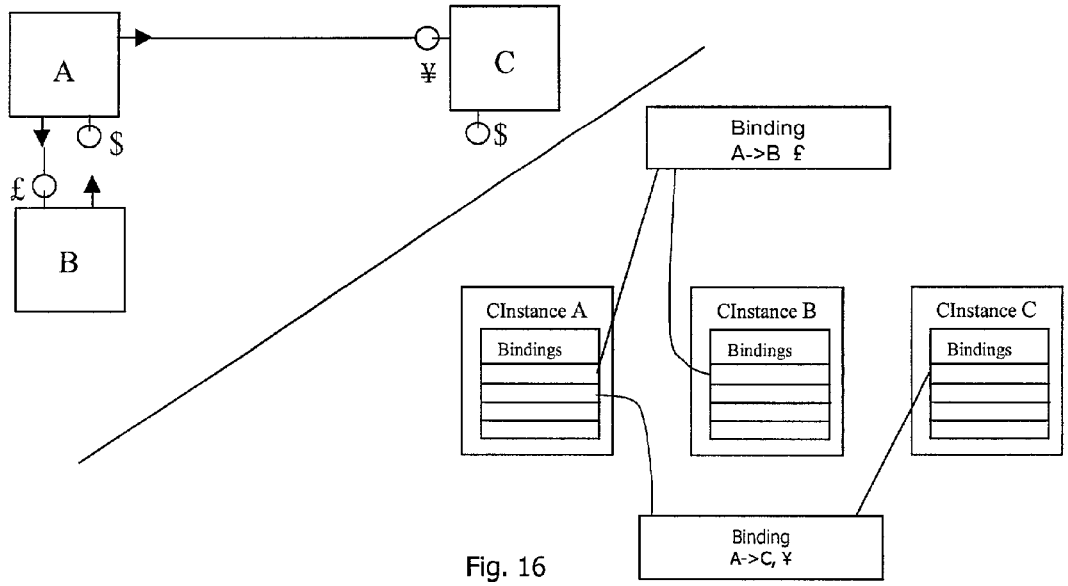
Figure 17:
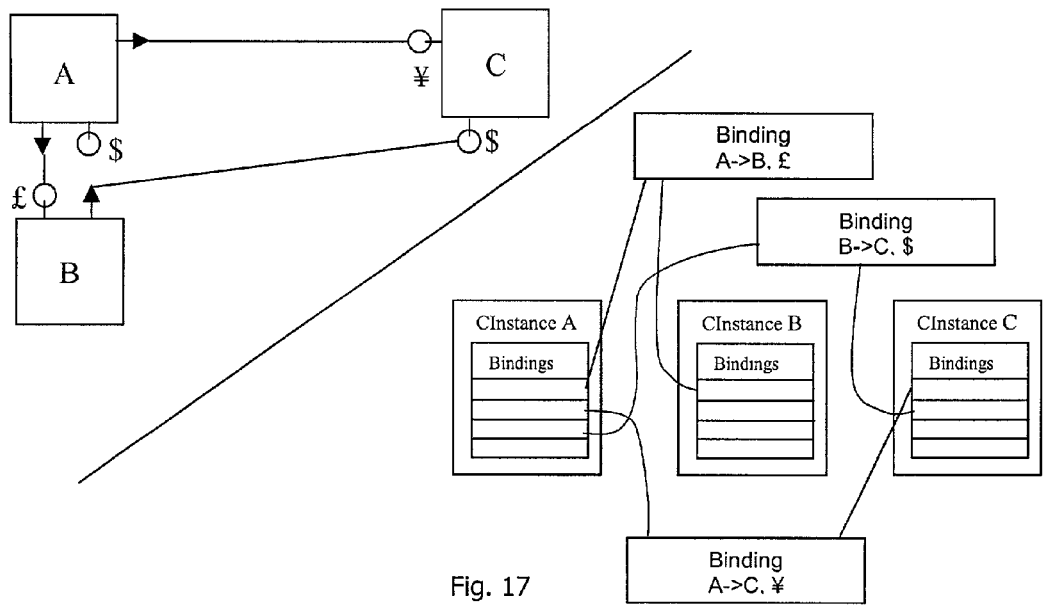

In the above example if it were desired to change the binding from Component B to Component A on interface "$" to be from Component B to Component C on interface "$", the calls shown in FIGS. 16 and 17 would be made.

A component implementation should not be allowed to die before it has done any necessary cleaning-up. This 'cleaning-up' involves destroying any bindings it holds with other components. To kill a component that has been instantiated by instantiateComponent ( . . . ) the activation layer 32 component object should be deleted.

The process involved is as follows:
1. When delete is called on the CComponent object this in turn will delete the CInstance object which it holds a pointer to.
2. The destructor of CInstance will call delete on the Binding List, this will cause delete to be called on all the CBinding* pointers.
3. Calling delete on a CBinding object will cause the connection to be destroyed (as before) and also the Binding* will be removed from the BindingList on both affected CInstance classes.
4. Therefore when the entire list has been deleted, all the bindings associated with a component will have been destroyed.
5. Finally (in a CDCOMInstance object) a final DCOM Release( ) is called on the IUnknown of the previously instantiated concrete component.
6. The instantiated concrete component will then die.

Figure 18:
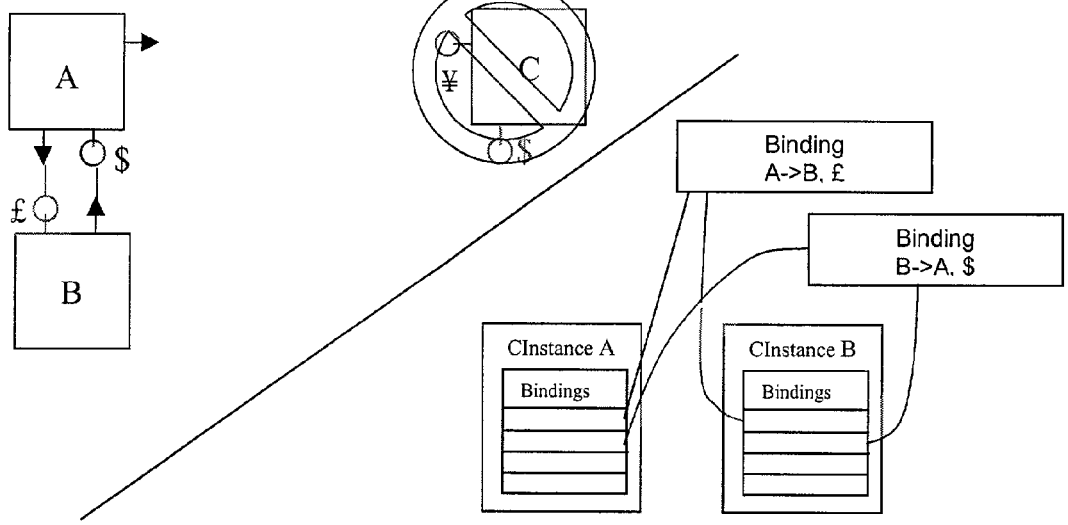
Figure 19:
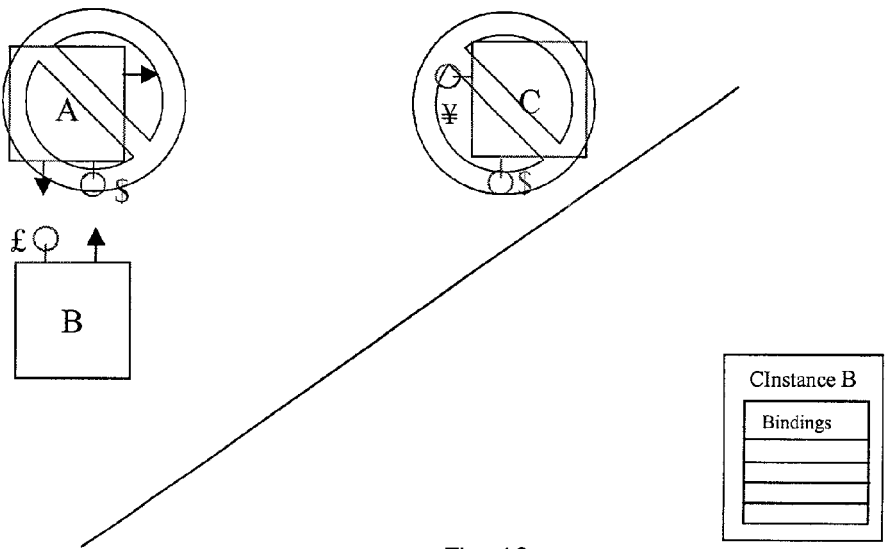
Figure 20:
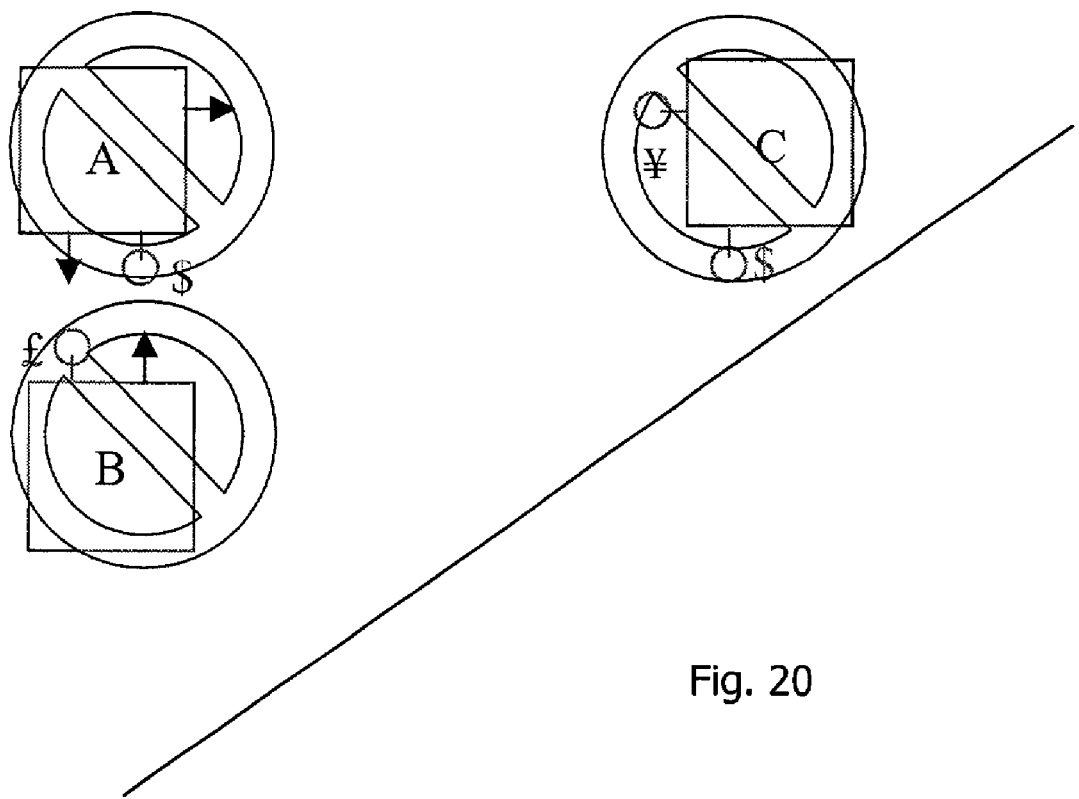

If the example shown previously were to be shut down in the following order,
 delete CComponent_C;
 delete CComponent_A;
 delete CComponent_B;
 the system would shut down as shown in FIGS. 18, 19, and 20.

The system has now been shut-down cleanly. The order that the components are killed in does not matter to the Activators, however it may matter to the system itself.

Activators

The detailed actions of the activation layer are, as mentioned above, technology specific. In the preferred embodiment, an activator is included in the activation layer for each supported technology. The activation layer provides generic activation functionality and directs the detailed activation task to the appropriate activator, as determined by the information obtained from the meta-model objects passed to it.

COM Activator

The COM activator assumes components are implemented using a connection point model. This means that each component provides a standard COM interface set that provides access to connection points, which are essentially a list structure capable of storing the typed identity of external components that implement services the component requires. A COM component implementation will have been written to use these connection points when external services are required.

The activator instantiates COM components via the standard CoCreateInstanceEx( . . . ) COM call. Then, once the components are instantiated, they are configured via the component's connection point API, advising it of service providers. The meta-model objects representing connections between component objects provide the necessary information to drive this configuration process. In this way, all component objects and connections represented in the meta-model cause an equivalent runtime instantiation and configuration in the running software system, so that what results is an executing software system accurately represented by the UML model.

.Net Activator

As a contrasting example to COM, the .Net activator operates in a different manner. .Net does not naturally support connection points (there is a connection point equivalent, called events, but this is considered an advanced topic, and so not anticipated to be in widespread use) and so components in .Net are assumed to be written using traditional object-oriented techniques. This implies that external components are imported as .Net assemblies and instances are created and methods of these invoked in an equivalent manner to objects in object-orientation. This presents a more dynamic model in which dependencies between component instances are created in the process of method execution in addition to being statically defined dependencies. The .Net activator thus is required to operate in a very different reactive manner when enforcing connections between components. It intercedes in the loading of external assemblies as and when this occurs as a result of the execution of .Net code. This intercession allows it to manipulate the dependency creation in order that the dependency mandated by the UML model is achieved.

The .Net assembly is the fundamental unit of system composition. An assembly exists as either a single DLL or EXE, or as a set of DLLs and/or EXEs. Assemblies carry metadata that describes the types provided by the assembly, and the assemblies on which this assembly depends. Other metadata exists also which is not immediately relevant to this discussion.

An advantage that the .Net metadata model provides is to allow information regarding interface provision and requirement to be extracted from compiled code. With the metadata available and disassembly of the code to Intermediate Language (IL) form, a full component type can be inferred.

The execution and binding model described herein relies on the hosting and configuration of the Microsoft Common Language Runtime and on the dynamic rewriting of binding information in Assemblies as they are loaded. It makes use of standard .Net APIs and tools, which will be detailed as necessary below.

To instantiate a .Net component, the appropriate UML model elements detailing the .Net component is passed to the execution layer as before. This Activation Layer delegates the instantiation of the .Net component to the .Net activator, which is a CLR (Microsoft's Common Language Runtime) Host. A CLR host can load and configure the CLR before passing control to it for the execution of a .Net system. Importantly, the hosting program can obtain quite fine grained control of what code is loaded, and what should occur should the CLR be unable to find assemblies—the CLR host program can override standard binding between assemblies.

The .Net execution architecture for this invention comprises a CLR Host that consists of two elements:
 C++ shell program: This simply instantiates a CLR, and loads a c# component which handles the actual work.

C# Host: This c# component configures the CLR and manages the loading of the .Net application. The real work is performed in c# in order to avoid interoperability overhead between managed (c#, .Net) and unmanaged (C++) code.

The CLR Host receives two things from the activation layer 32:

Identity of the .Net Assembly to be instantiated, including details such as type or initial execution point if appropriate.

Access to the UML model of the entity the assembly/type is to fulfill within the UML model.

The .Net activator must perform two tasks:

Load the required assembly and begin execution of the assembly (EXE) or create the required type (DLL).

Ensure that the executing code is bound correctly to its required partners as specified in the UML model.

The .Net component binding relies on the metadata included in .Net assemblies that details external assembly referencing. To bind an assembly to components mandated by the UML model, this metadata is accessed and if necessary, changed. In addition, the assembly containing the component to be instantiated is disassembled to IL (intermediate language). In conjunction with the UML model for this component and connections between it and other components, the metadata and IL is then manipulated to produce a variant of the original code which is bound to the appropriate assemblies and types as mandated by the UML model. This variant is then assembled and loaded into the CLR. It is important to note that only binding details are changed—the functional code in the assembly remains untouched in every other respect. The CLR performs the actual binding as required during the execution of the .Net system. The diagram below illustrates a sample modification of IL, to change a dependency on System.Console.Writeline( . . . ) to Other.Text.WriteStuff( . . . ).

| Original | ExampleModified |
|---|---|
| IL_0015: call  void [mscorlib]System.Console::WriteLine(string) | IL_0015: call  void [otherlib] Other.Text::WriteStuff(string) |

The modified assemblies can be saved for later executions of the system. The execution model thus proceeds as follows:

The CLR Host is triggered by the RDS to load the required first assembly into the CLR by the Activation Layer. It loads a modified version of that assembly that reflects the UML application model.

If the UML model dictates, a type in the assembly is instantiated, or an execution point is begun. [draft—requires further detail]

The RDS continues to initiate the loading of assemblies and instantiation of types as dictated by the UML model.

As the execution progresses, the CLR loads and binds further assemblies dynamically at runtime, as they are referenced by executing code (because an object defined in a remote assembly is created, for example). Whenever an external assembly is referenced, control is passed back to the CLR Host for loading.

Assuming that the CLR Host has not already loaded the required assembly into the CLR, it then loads it, modifying it as necessary as before.

Ultimately, all assemblies used in the course of the execution of the system, are loaded in modified form.

The CLR Host must configure the Common Language Runtime in order that the CLR defers to the CLR host when attempting to load assemblies which it cannot find. This is achieved by attaching an event handler to an event supported by the CLR. The following code sample demonstrates this.

```
try
{
    ResolveEventHandler trl = new ResolveEventHandler
(this.assemblyResolveHandler);
    appDomain.AssemblyResolve += trl;
}
catch (Exception exe)
{
    Console.WriteLine ("Exception when registering AssemblyLoad event Handler");
    Console.WriteLine (exe.ToString ());
    throw exe;
}
```

Dynamic Change

As described above, the RAS 10 is responsible for executing a system, and performs this task via a maintained meta-model of the UML architecture that is used to instantiate and configure component implementations at boot time. As the software system executes, this meta-model is maintained such that, for example, the API 33 can be used to stop a system executing, which results in the meta-model causing the system to be shut down in cooperation with the activation layer 32.

The API 33 allows specific parts of the meta model to be shut down, with corresponding effect on the component implementations that form the software system. The meta-model in conjunction with the API 34 and the meta-model API 33 thus provides a means of manipulating the content and structure of a live system.

The RAS 10 thus supports dynamic change of the meta-model on a piecemeal basis and thus of the executing system, by direct manipulation of the meta-model. In addition, the RAS supports the transformation of a UML model 3 from one form to another, wherein that transformed form includes a series of one or more differences in terms of the number, type, identity, and/or connections between component objects. This is achieved by specialising a UML model 3 to include the differences and by instructing the RAS 10 to load and apply the new model to the running system. Following appropriate type checking, the executing system is attached to the new model, those implementations no longer required are removed, those implementations newly required are instantiated, and the connections between implementations are reconfigured to reflect the alternate design. This process can be reversed, involving a transformation from a specialised design back to the original design, and indeed from a design in a hierarchy of designs to any other in that hierarchy, related by howsoever many intermediate designs.

It will be appreciated that the invention allows excellent flexibility because the system may be dynamically modified by simply modifying the meta model. The activation layer then performs the instantiation in an automated manner.

The invention is not limited to the embodiments described but may be varied in construction and detail.

The invention claimed is:

1. A process for development of a software system, the process comprising the steps of:
   providing components, each having executable code;
   providing a meta model, said meta model having a hierarchical structure, and comprising:
   a type model comprising a specification of the types of components in terms of interfaces and in terms of services implemented by components, and in which the interfaces are those supported by a component and those of services that a component requires, and
   an instance model for instantiating the type model;
   a runtime activation service dynamically instantiating the executable code components according to the meta model by the instance model instantiating the type model; and
   maintaining the meta model and dynamically modifying the system by modifying the meta model, and re-instantiating the components according to the modified meta model.

2. The process as claimed in claim 1, wherein the meta model is generated from a design model arising from a specification phase, the design model specifying the system in terms of components and their interactions.

3. The process as claimed in claim 2, wherein the design model is represented as a markup language file.

4. The process as claimed in claim 3, wherein the meta model is saved to storage by transforming it back to an associated design model in said markup language.

5. The process as claimed in claim 4, wherein the design model models the system declaratively as a graph of instances of component types and allowed interactions between them.

6. The process as claimed in claim 5, wherein the design model models a component type as an abstraction that specifies interfaces supported by a component and interfaces that a component requires.

7. The process as claimed in claim 6, wherein a component type is specified as a specialisation of another component type.

8. The process as claimed in claim 6, wherein a component type specifies how a plurality of component types may be aggregated to form a composite component type, and in which the composite component type is modelled as a template.

9. The process as claimed in claim 8, wherein channels between component instances are templated such that they can be bound to specific interface types on subsequent reuse of the templated component type.

10. The process as claimed in claim 2, wherein the meta model is generated by parsing the design model to generate a hierarchical graph of connected objects.

11. The process as claimed in claim 10, wherein the parsing generates a token stream arising from lexical analysis, the token stream representing markup language elements and attributes.

12. The process as claimed in claim 11, wherein the token stream is parsed in a plurality of passes comprising:
   a syntactic parsing pass to create meta model objects;
   a linking parsing pass to create links between objects based on defined bi-directional associations;
   a pass to refine the objects according to stereotypes; and
   a pass to perform semantic model validation for correct behaviour.

13. The process as claimed in claim 12, wherein the stereotypes include:
   a component type stereotype;
   a realisation stereotype to extend abstraction; and
   an interface requirement stereotype.

14. The process as claimed in claim 1, wherein the meta model is modified by a modelling tool an API, the tool having a model view pattern on the meta model.

15. The process as claimed in claim 1, wherein the dynamic modification of the meta model comprises dynamically changing the number and identity of component instances, component types, and their interactions.

16. The process as claimed in claim 1, wherein the meta model is dynamically modified by generating a fresh or modified design model, transforming the design model to a meta model, and re-assembling the system according to the new meta model.

17. The process as claimed in claim 1, wherein the meta model automatically performs self type-checking before assembly of the system.

18. The process as claimed in claim 1, wherein the system assembly is performed by a technology-independent activation manager and at least one technology-specific activator, in which the activation manager directs at least one activator to:
   instantiate components,
   bind components, and
   unbind components.

19. The process as claimed in claim 18, wherein the activation manager is an object which presents public methods for instantiating components, for binding components, and for unbinding components, and in which the activation manager instantiates technology-specific components by:
   retrieving a technology identifier;
   searching a list of currently instantiated technology-specific activators and identifying one having the same technology identifier; and
   said activator instantiating a component.

20. A process for development of a software system, the process comprising the steps of defining a meta model and using the meta model to generate executable code, characterised in that,
   the process comprises a step of storing components each having executable code;
   the meta model has a hierarchical structure defining how a system is to be assembled by instantiating components in runtime;
   the system is assembled by dynamically instantiating the components in runtime according to the meta model;
   the meta model is generated from a design model arising from a specification phase, the design model specifying the system in terms of components and their interactions;
   the meta model is maintained and the system is dynamically modified by modifying the meta model and re-instantiating the components according to the modified meta model, wherein the meta model is modified by a modelling tool and an API, the tool having a model view pattern on the meta model.

21. A software system comprising:
   components having executable code,
   an adapter for generating a meta model from a design model, the meta model defining how the components are to be instantiated in runtime, and comprising:
   a type model comprising a specification of the types of components in terms of interfaces and in terms of services implemented by components, and in which the interfaces are those supported by a component and those of services that a component requires; and an instance model for instantiating the type model;

a meta modeller for maintaining the meta model;

a runtime activation service for dynamically instantiating the executable code components according to the meta model by the instance model instantiating the type model;

a modelling tool for interacting with the meta modeller to modify the meta model; and means in the runtime activation service for re-instantiating the components according to the modified meta model to modify the system.

22. The system as claimed in claim 21, wherein the activation sub-system comprises a technology-independent activation manager and at least one technology-specific activator, in which the activation manager comprises mean for directing at least one activator to:
  instantiate components,
  bind components, and
  unbind components.

23. A computer program product comprising software code for performing the step of claim 1 when executing on a digital computer.

* * * * *